C. B. HARRINGTON.
MOTION PICTURE MACHINE.
APPLICATION FILED APR. 13, 1918.

1,321,629.

Patented Nov. 11, 1919.
4 SHEETS—SHEET 1.

INVENTOR
C. B. Harrington
BY
H. E. Dunlap
ATTORNEY

C. B. HARRINGTON.
MOTION PICTURE MACHINE.
APPLICATION FILED APR. 13, 1918.
1,321,629.
Patented Nov. 11, 1919.
4 SHEETS—SHEET 2.
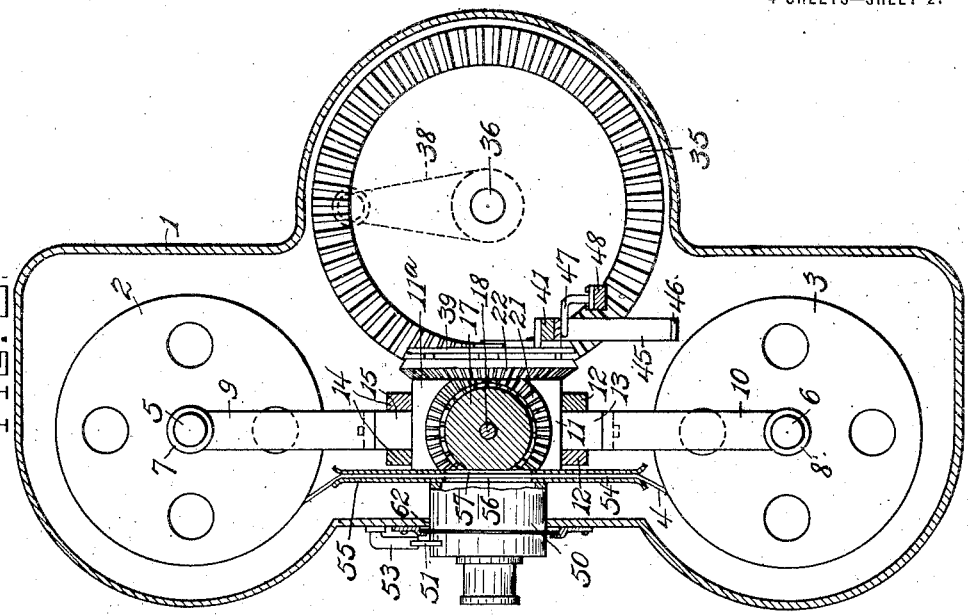
INVENTOR
C. B. Harrington
BY
N. E. Dunlap
ATTORNEY

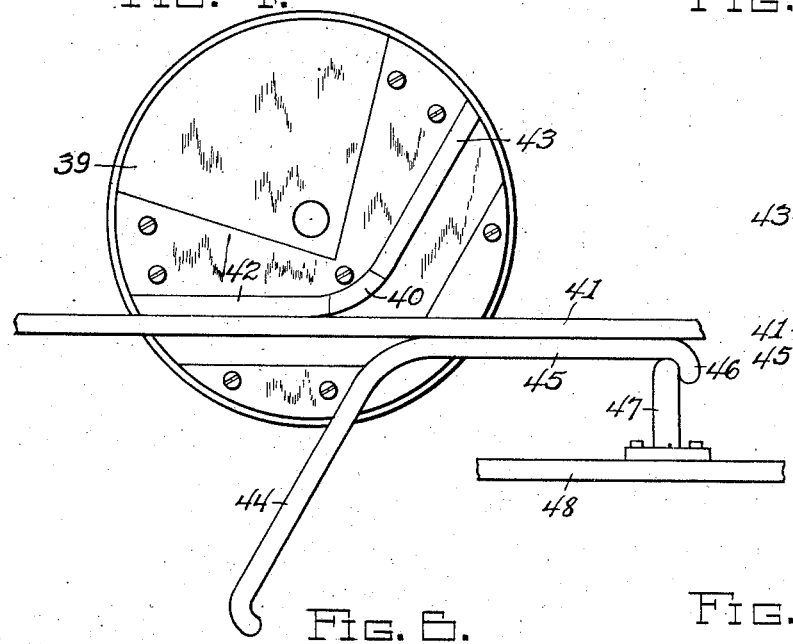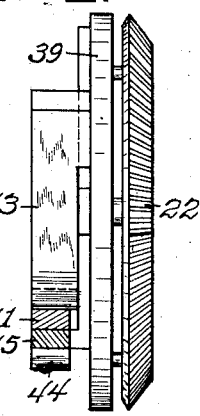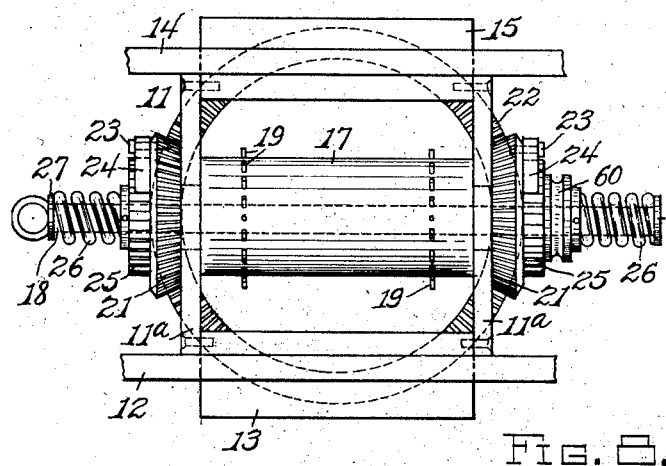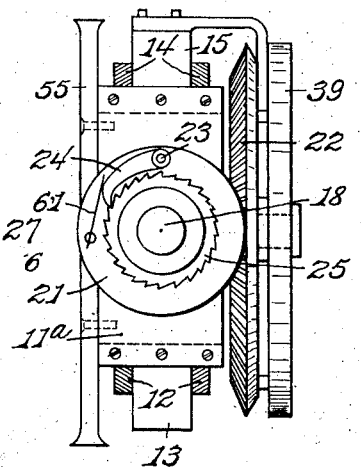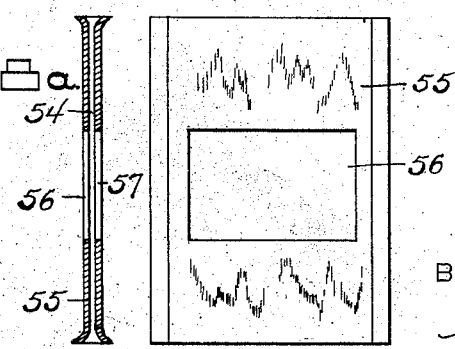

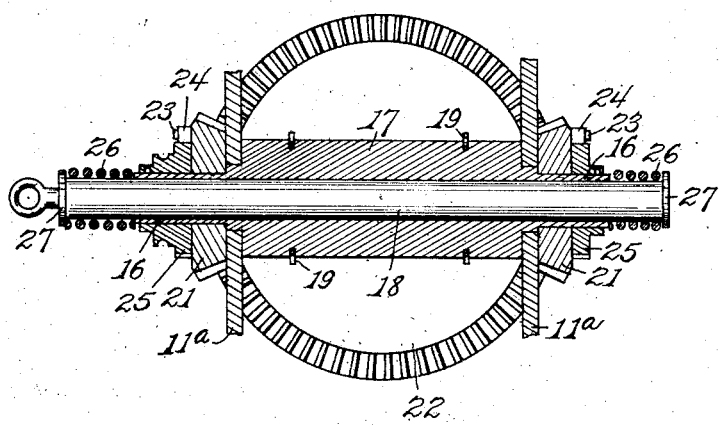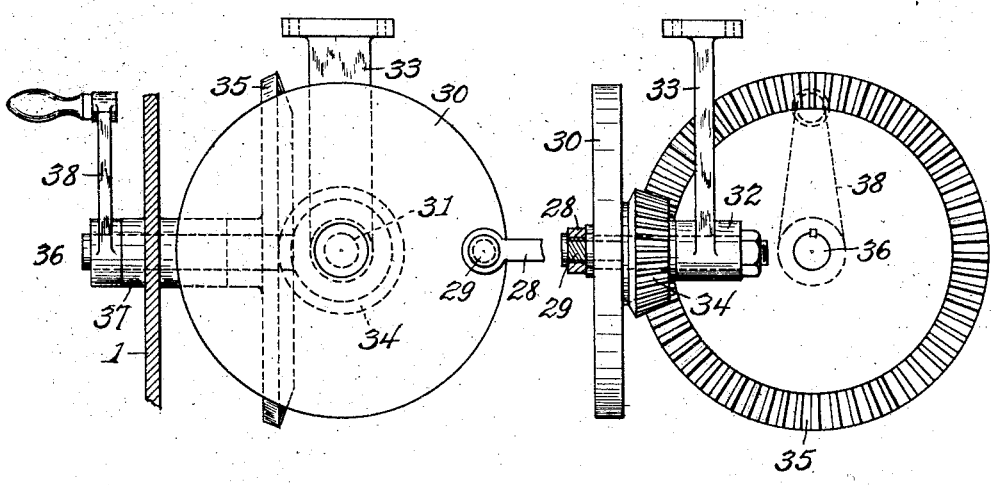

UNITED STATES PATENT OFFICE.

CLAUDE B. HARRINGTON, OF McMECHEN, WEST VIRGINIA, ASSIGNOR OF ONE-FOURTH TO GLENN HARDMAN, OF McMECHEN, WEST VIRGINIA.

MOTION-PICTURE MACHINE.

1,321,629.      Specification of Letters Patent.      Patented Nov. 11, 1919.

Application filed April 13, 1918. Serial No. 228,363.

*To all whom it may concern:*

Be it known that I, CLAUDE B. HARRINGTON, a citizen of the United States of America, and resident of McMechen, county of Marshall, and State of West Virginia, have invented certain new and useful Improvements in Motion-Picture Machines, of which the following is a specification.

This invention relates broadly to motion picture apparatus, and more specifically to a motion picture camera or machine.

The primary object of the invention is to provide a machine embodying a motion picture camera whereby the camera is shifted back and forth between two separated exposure positions and alternate exposures are effected at said separated positions, so that when said pictures are viewed in rapid succession, substantially the same stereoscopic effect is seen as if the actual object photographed were viewed in binocular vision.

A further object is to provide a machine of the character mentioned in which the camera and the film are actuated to reciprocate between suitably separated exposure positions and remain at rest in each of said positions for a short interval of time during which exposure is made.

A still further object is to provide, in a machine of the character mentioned, automatic means for advancing the film a definite distance between exposures, or during the reciprocating movement of the camera.

With these and other important objects in view, the invention resides in the features of construction, arrangement of parts and combinations of elements which will hereinafter be exemplified, reference being had to the accompanying drawings, in which—

Fig. 2 is a partial front elevation;

Fig. 3 is a partial sectional elevation taken substantially on the line 3—3, Fig. 1;

Fig. 4 is an enlarged rear elevation of a portion of the film-advancing mechanism;

Fig. 5 is a side elevation of the same;

Fig. 6 is a front elevation of the film-advancing mechanism and the carriage upon which said mechanism is mounted;

Fig. 7 is an end view of the same;

Fig. 8 is a front elevation of the film guide;

Figure 1:
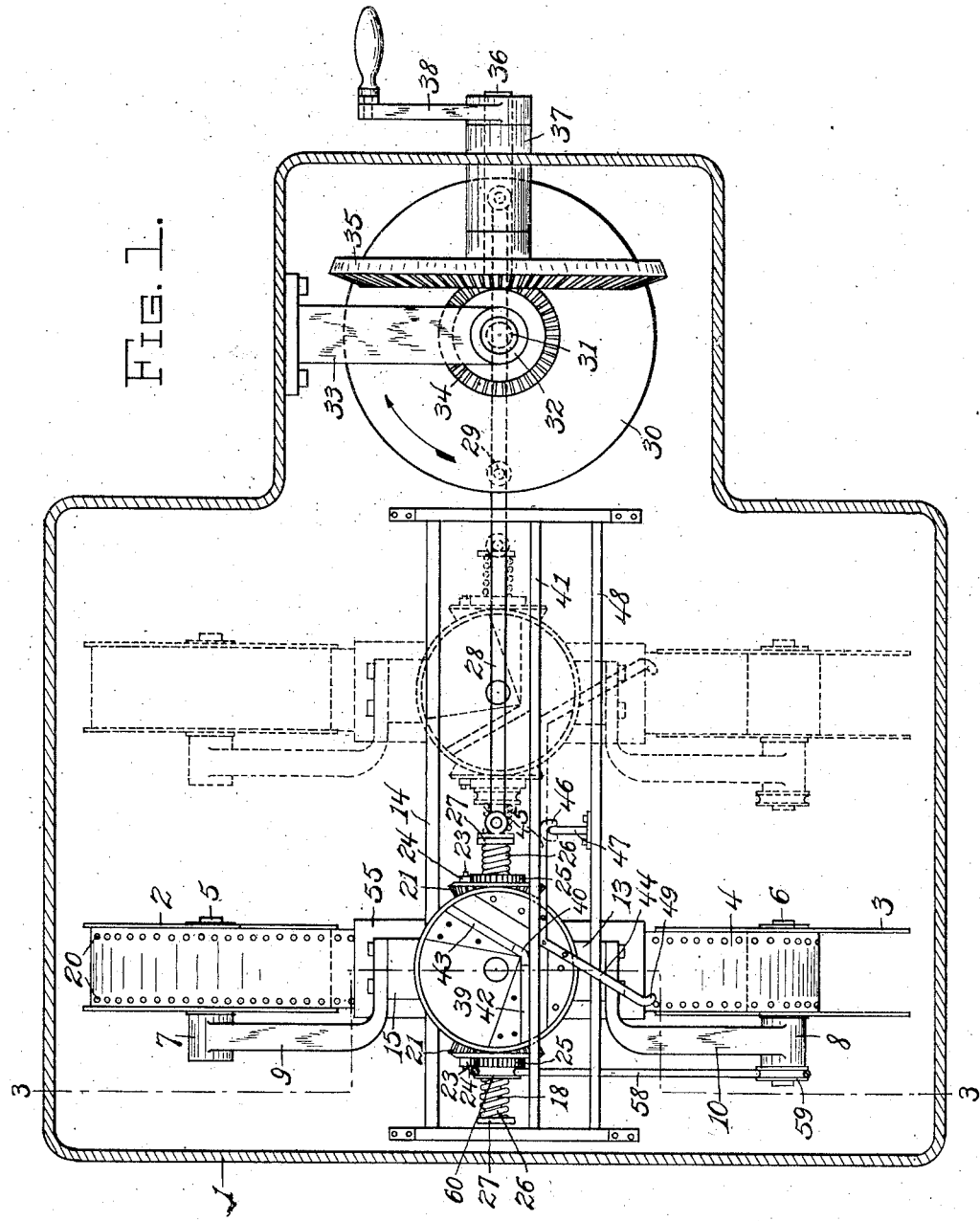
Figure 1 is a sectional elevation of the invention viewed from the rear.

Fig. 8ª is a vertical section of the same;

Fig. 9 is a longitudinal section of the film-advancing mechanism;

Fig. 10 is a front elevation of the carriage reciprocating mechanism; and—

Fig. 11 is a side view of the same.

Referring to said drawings, in which like designating characters distinguish like parts throughout the several views—

1 indicates generally a casing within the upper and lower portions, respectively, of which are disposed the usual reels 2 and 3 for carrying a film 4. Said reels 2 and 3 are carried, respectively, by spindles 5 and 6 which are rotatably mounted in bearings 7 and 8 carried by brackets 9 and 10 which are stationarily mounted, respectively, on the upper and under sides of a carriage 11. Said carriage is mounted to travel laterally back and forth upon a fixed frame or trackway which comprises a pair of horizontally disposed parallel members 12 constituting supports upon which the carriage rides and between which a guide-piece 13 composing a part of said carriage is snugly and slidably received. Disposed in closely overlying relation to said carriage and designed to maintain the latter seated upon said members 12 is a pair of horizontally disposed parallel members 14 similar to said members 12 and between which a guide-piece 15 similar to said piece 13 and forming a part of said carriage is slidable. Said brackets 9 and 10 are respectively mounted upon said guide-pieces 15 and 13, as shown.

Said carriage 11 also includes a pair of opposite vertically disposed end members 11ª which are rigidly connected adjacent to their upper and lower edges, respectively, by said guide-pieces 15 and 13, and journaled in said end-members or in suitable bearings carried by the latter are the hollow spindle-like reduced ends 16 of a cylinder 17 which is located between said members 11ª and which has two suitably located circumferential rows of pins 19 designed to enter the usual rows of perforations 20 provided in the marginal edges of the film 4, so that said film is positively advanced from the upper reel 2 to the lower reel 3 when said cylinder is actuated to rotate.

Loosely mounted to be rotatable upon the cylinder spindles 16 at opposite ends of the carriage are oppositely facing bevel-gears 21 both of which are in mesh with a large bevel-gear 22 located rearward of the carriage 11. Each of said bevel-gears 21 carries on its outer face a pin 23 upon which is pivoted a forwardly directed pawl 24 having its point held in engagement with the teeth of an adjacent ratchet wheel 25 by means of a spring 61. Said ratchet wheels are fixed on the opposite cylinder spindles 16 so that rotation imparted to either of the former is communicated to the cylinder. As is obvious, rotation of the large gear 22 in one direction imparts forward rotation to the cylinder 17 through one of said gears 21 and the associated pawl and ratchet, while the other pawl freely rides rearward over the teeth of the ratchet with which it is associated. Reverse rotation of the gear 22 imparts like forward rotation to said cylinder through the last-mentioned gear 21 and the therewith associated pawl and ratchet, while the first mentioned pawl rides freely over the teeth of the therewith associated ratchet.

Extending longitudinally through the cylinder 17 and the spindles 16 and freely movable with respect to said parts is a rod 18 the opposite ends of which protrude outward from the outer ends of said spindles 16. Coil springs 26 are disposed in encircling relation to the projecting ends of said rod, said springs being interposed between collars 27 carried by said rod and the adjacent ends of said cylinder spindles, said springs tending to yieldingly hold said rod against longitudinal movement with respect to the carriage and the parts carried by the latter and serving a purpose which will hereinafter be explained.

One end of said rod 18 has pivotally connected thereto an end of a pitman 28 which has its opposite end mounted upon a crank-pin 29 carried eccentrically by a disk 30 which is fixed upon a shaft 31 journaled in a bearing 32 carried by a bracket 33 mounted upon a suitable part of the casing 1. Said shaft 31 has fixed thereon a small bevel gear 34 in mesh with a large bevel gear 35 carried by a drive-shaft 36 which is journaled in a bearing 37 carried by the casing 1 and which carries an operating crank 38 located outside the casing.

From the foregoing description it will be understood that driving power applied to the shaft 36 through the crank 38 effects rotation of the shaft 31 and disk 30 through the bevel-gears 34 and 35. Rotation of said disk accomplishes, through the intermediacy of the pitman 28 and the rod 18, reciprocation of the carriage 11 on its trackway between the full line and dotted line positions shown in Fig. 1 for alternately presenting lengths of the film 4 for exposure at said positions.

Disposed at the rear of, and fixed to or otherwise associated with, the large bevel gear 22 so that the latter will rotate therewith is a plate or disk 39 which carries on its rear face means whereby the extent of rotary movement thereof and, consequently, of the bevel-gear 22 is limited. The movement-limiting means herein shown, which is merely illustrative of one of various devices which might be employed, includes an arcuate rocker 40 located at an appropriate distance from the axis of said disk 39. Disposed at a suitable angle with respect to each other and extending outward from the opposite ends of said rocker 40 are straight arms 42 and 43 which serve as stops, being adapted to seat alternately upon a horizontal guide-bar 41 to positively limit the extent of the forward and reverse rotary movements of the cylinder-actuating means, such movements being accurately predetermined in extent to produce an advance of the film through a definite distance which is the distance requisite to present successive exposure areas in properly spaced relation.

Also carried by the disk 39 below the plane of the guide-bar 41 are two arms 44 and 45 relatively disposed at an angle corresponding to that of said arms 42 and 43, said angle being located in the extended radial line of the angle between said arms 42 and 43, but reversely disposed. At one limit of movement of the disk 39 the arm 42 rests flat upon the upper face of the guide-bar 41 and the arm 45 rests flat against the under face of said bar, said arms being disposed in parallel alinement. The arms 43 and 44 are likewise arranged in parallel alinement so that, at the opposite limit of rotary movement of said disk, they occupy positions respectively closely overlying and underlying said guide-bar. In the position shown in Fig. 4, which is also the position shown in full lines in Fig. 1, a downturned lip or hook 46, with which the outer end of the arm 45 terminates, is engaged with a lug or stop member 47 which is stationarily mounted upon a suitable support, as a member 48 of the frame, at a point midway between the opposite exposure positions assumed by the carriage and the carriage-borne parts of the mechanism. Said stop 47 serves both as a stop whereby a positive limit is fixed for movement of the carriage and as a means whereby said disk 39 is positively maintained against rotary movement, during the last half of the shifting movement of the carriage and during the first half of the return shifting movement.

A lip or hook 49 similar to the hook 46 is carried by the outer end of the arm 44, the same being adapted to interlock with said stop 47 at the opposite limit of movement of the carriage.

Assuming that the parts of the mechanism occupy the positions shown in full lines in Fig. 1, forward rotation of the crank 38 will, through the intermediate mechanism described, draw the carriage toward the dotted-line position shown in said figure. In moving forward, the arm 45 will be maintained horizontal, sliding between the guide-bar 41 and the stop 47, until the carriage 11 reaches the midway position, at which point the angle between the arms 44 and 45 is reached. When the inner end of the arm 44 engages said stop, said parts coact to impart a partial clockwise rotation of the disk 39 and gear 22 which is terminated by the arm 44 assuming closely underlying relation to the guide-bar 41 and the arm 42 assuming overlying relation to said bar. During the remainder of the reciprocating movement of the carriage, as also during the first half of the return reciprocation, the disk 39 is maintained against rotary movement, said arm 44 being held between said bar 41 and the stop 47. When the hook 49 engages the stop 47, movement of the carriage in that direction ceases, and the carriage remains stationary for a slight interval as and for a purpose which will presently be explained.

At the instant that the hook 49 engages the stop 47, preventing further left to right movement of the carriage, the shutter located within the lens-holder 50 of the camera, which projects outward through a slot 62 in the casing, is opened in a suitable manner, as by the engagement of an actuating lever or trigger 51 with a stationary arm 52 located at an appropriate point upon the front wall of the casing 1.

The stoppage of the carriage and the simultaneous opening of the shutter, as explained, occurs slightly prior to that point in the operation of the carriage-actuating means where the pitman 28 and the rod 18 lie in direct alinement, so that the carriage, the film and the parts of the photographic mechanism proper remain stationary with the shutter open during an interval of time necessary to effect a proper exposure. The coil spring 26 carried by the left-hand end of said rod 18 is compressed and reëxpands during said interval, the same being sufficiently contractile to permit the rod 18 to move through the cylinder 17 the requisite distance to permit the pitman 28 to pass over center, or over the point at which said pitman and said rod are in alined relation. As is obvious, the duration of the period or interval during which the parts of the photographic apparatus remain stationary and focused upon the objective may be increased or diminished by substituting pitmen of relatively shorter or greater lengths.

In the right to left movement, the carriage is stopped by engagement of the hook 46 with the stop 47, and the shutter is opened by engagement of the trigger 51 with a second suitably located arm 53, slightly prior to the instant in which the pitman 28 and rod 18 assume alined relation, the coil spring at the right-hand end of said rod permitting the slight additional longitudinal travel of the latter necessary to allow the pitman to pass over center, or into such alined relation. Thus, as is apparent, the photographic apparatus remains stationary and the shutter remains open at each of the exposure positions throughout the short period required to effect a proper exposure.

The extent of the rotary movement imparted to the cylinder 17 with each actuation thereof in the manner hereinbefore described is such that the film 4 is advanced between successive exposures such a distance that a new exposure area of the requisite length is presented in line with the lens. Said film travels through a vertical passage 54 provided therefor in a suitable film-guide 55 which is rigidly mounted upon the front side of the carriage 11. Said film-guide has a rectangular opening or gate 56 in the front face thereof through which the requisite area of the film is exposed, and has a similar opening 57 in its rear face which permits the pins 19 carried by the cylinder 17 to unobstructedly engage the film for advancing the latter.

The reel 3 upon which the film is being wound is rotated by any suitable means, as by a belt 58 connecting pulleys 59 and 60 carried, respectively, by the spindle 6 and the outer face of one of the ratchet wheels 25, as shown.

From the foregoing description it will be understood that continuous rotation of the operating crank 38 produces reciprocation of the carriage 11 and the photographic apparatus carried thereby between two established exposure positions located a suitable distance apart; that said carriage and apparatus remain at rest in each of said positions throughout a suitable interval of time, and that the light-excluding shutter of said apparatus remains open during such interval, permitting exposure of a suitable length of the film. Further, the film is advanced a definite distance at a midway point in each reciprocation so that a new area thereof is presented at each exposure position.

As will be apparent, successive pictures carried by the film are the result of exposures taken at points located at a definite distance apart, as about three inches. Obviously, therefore, when such pictures are exhibited by projecting the same upon a screen in rapid succession, a stereoscopic effect is created, the successive pictures taken alternately from the two slightly separated points of view being caused to blend or dissolve to produce stereoscopic vision in which the observer receives the impression of a single image viewed with both eyes.

What is claimed is:

1. A motion picture machine comprising a camera, means including a longitudinally movable member carrying resilient cushioning elements connected to said camera whereby the latter is reciprocated between two separated definitely related exposure positions, and means for effecting exposure at each of said positions.

2. A motion picture machine comprising a film camera, means for intermittently reciprocating said camera between two separated definitely related exposure positions said means including a longitudinally movable member carrying resilient cushioning elements connected to said camera, means for effecting film exposure at each of said positions, and means for advancing the film between exposures.

3. A motion picture machine embodying a film camera, means including a longitudinally movable member carrying resilient cushioning elements connected to said camera for imparting reciprocatory movement whereby said camera is alternately positioned in two definitely related exposure positions, means for effecting film exposure at each of said positions, and means maintaining said camera stationary during film exposure.

4. A motion picture machine embodying a film camera, means including a longitudinally movable rod carrying resilient cushioning elements connected to said camera for imparting intermittent reciprocatory movement whereby said camera is alternately positioned in two definitely related exposure positions, means for effecting film exposure at each of said positions, means maintaining said camera stationary during film exposure and during a part of each reciprocation of said camera-reciprocating means, and means for advancing the film prior to each exposure.

5. A motion picture machine embodying a film camera, means including a rod having coil compression springs on its opposite ends associated with said camera whereby intermittent reciprocatory movement is imparted to the latter for alternately positioning the same in two definitely related exposure positions, means for effecting film exposure at each of said positions, means maintaining said camera stationary during film exposure, and means for advancing the film during reciprocating movement of the camera.

6. In a motion picture machine, a film camera, means having yieldable connection with said camera for reciprocating the latter, said reciprocating means being adapted to alternately position said camera in two separated definitely related exposure positions reached by said camera prior to the ends of the reciprocating strokes of said means, means automatically opening the shutter of the camera as the latter assumes each of its exposure positions, and means actuated during reciprocating movement of the camera for advancing the film.

7. In a motion picture machine, a film camera, reciprocatory means for intermittently reciprocating said camera whereby the latter is alternately positioned in two separated definitely related exposure positions, said means having yieldable connection with said camera whereby the latter is permitted to be arrested prior to the completion of the strokes of said means, means automatically opening the shutter of the camera as the latter assumes each of its exposure positions, and means actuated during reciprocating movement of the camera for advancing the film during said movement.

8. In a motion picture machine, a carriage, a film camera mounted on said carriage, film-advancing means carried by said carriage, means for imparting intermittent reciprocatory movements to said carriage, means controlled by movement of the carriage whereby said film-advancing means is actuated during each reciprocation of the carriage, and means effecting film exposure at each limit of movement of the carriage.

9. In a motion picture machine, a carriage, a film camera mounted on said carriage, film-advancing means carried by said carriage, means for imparting reciprocatory movement to said carriage, means controlled by movement of the carriage whereby said film-advancing means is actuated, and means effecting film exposure at each limit of movement of the carriage, said carriage-reciprocating means permitting an interval of rest at each of said limits.

10. In a motion picture machine, a carriage, a film camera mounted on said carriage, means for intermittently reciprocating said carriage between two separated definitely related exposure positions, film-advancing means, and means whereby said advancing means is actuated by and during each reciprocation of the carriage.

11. In a motion picture machine, a carriage, a film camera mounted on said carriage, means for reciprocating said carriage between two separated exposure positions, film-advancing means including a film-feeding cylinder, ratchet wheels fixed on opposite ends of said cylinder, spring-pressed pawls disposed in engagement with said ratchets, and means actuated in each reciprocation of the carriage whereby one of said pawls is caused to impart rotary movement to the engaged ratchet for producing a corresponding movement of said cylinder.

12. In a motion picture machine, a carriage, a film camera mounted on said carriage, means for intermittently reciprocating said carriage between two separated definitely related exposure positions, film-advancing means including a film-feeding cylinder, and means actuated by carriage reciprocation for imparting a definite rotary movement to said cylinder during each reciprocation of the carriage.

13. In a motion picture machine, a carriage, a film camera mounted on said carriage, means for reciprocating said carriage between two separated exposure positions, film-advancing means, means actuated by carriage-reprocating movement whereby a definite movement is imparted to said advancing means during each reciprocation of the carriage, and means for producing a film exposure of definite duration at each limit of movement of the carriage.

14. In a motion picture machine, a carriage, a film camera mounted on said carriage, means for reciprocating said carriage between two separated exposure positions, film-advancing means, means actuated by carriage movement whereby a definite movement is imparted to said advancing means during each reciprocation of the carriage, and means for producing a film exposure at each limit of movement of the carriage, said carriage-reciprocating means permitting an interval of rest at each of said limits.

15. In a motion picture machine, a carriage, a film camera carried by said carriage, a film-feeding cylinder journaled in said carriage, a rod extending through said cylinder and longitudinally movable with respect to the latter, springs carried by the opposite ends of said rod yieldingly maintaining said rod against movement with respect to said carriage, means for longitudinally reciprocating said rod whereby said carriage is reciprocated on said trackway, interengaging means whereby said carriage is stopped before the limits of the reciprocating movement of the rod are reached, and means for imparting film-advancing rotary movement to said cylinder during reciprocatory movement of the carriage.

16. In a motion picture machine, the combination with a film camera, of means for reciprocating said camera between two separated exposure positions whereby it is alternately presented in said positions, and means associated with said reciprocating means and actuated by reciprocating movement of the camera for intermittently advancing the film between exposures.

17. In a motion picture machine, a casing having a trackway therein, a film camera mounted on said trackway, means reciprocating the camera on said trackway between two exposure positions and including coil springs and a member which has connection through said springs with said camera to allow the latter an interval of rest at each of said positions, means actuated to open the camera shutter for exposing the film and whereby said shutter is maintained open during rest intervals, and means for advancing the film between exposures.

18. In a motion picture machine, the combination with a film camera, of means for reciprocating said camera between two separated exposure positions whereby it is alternately presented in said positions, said means including an eccentric, and a yieldable connection between said eccentric and said camera and means associated with said reciprocating means and actuated by reciprocating movement of the camera whereby the film is intermittently advanced.

19. In a motion picture machine, the combination with a film camera, of means for reciprocating said camera between two separated exposure positions whereby it is alternately presented in said positions, said means including a continuously driven eccentric, a longitudinally movable member, a pitman between said eccentric and said member, and a resilient element carried by each end of said member, and means associated with said reciprocating means whereby the film is intermittently advanced during said reciprocating movement.

In testimony whereof, I affix my signature in presence of two subscribing witnesses.

CLAUDE B. HARRINGTON.

Witnesses:
H. E. DUNLAP,
W. F. KEEFER.